United States Patent
Pal et al.

(10) Patent No.: US 12,395,044 B2
(45) Date of Patent: Aug. 19, 2025

(54) CAC MOTOR AUXILIARY WATER COOLING SYSTEM

(71) Applicant: Hamilton Sundstrand Corporation, Charlotte, NC (US)

(72) Inventors: Debabrata Pal, Hoffman Estates, IL (US); Viktor Kilchyk, Lancaster, NY (US); Aiden Coutin, Ogden, UT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 289 days.

(21) Appl. No.: 18/169,180

(22) Filed: Feb. 14, 2023

(65) Prior Publication Data

US 2024/0275241 A1    Aug. 15, 2024

(51) Int. Cl.
| | |
|---|---|
| *H02K 9/20* | (2006.01) |
| *B33Y 80/00* | (2015.01) |
| *B64D 13/02* | (2006.01) |
| *F04D 29/58* | (2006.01) |

(Continued)

(52) U.S. Cl.
CPC .............. *H02K 9/20* (2013.01); *B64D 13/02* (2013.01); *H02K 5/203* (2021.01); *H02K 7/14* (2013.01); *B33Y 80/00* (2014.12); *F04D 29/5806* (2013.01)

(58) Field of Classification Search
CPC ........ B33Y 80/00; B64D 13/02; B64D 13/06; B64D 2013/0618; B64D 2013/0644; F04D 29/5806; H02K 5/203; H02K 7/14; H02K 9/20
See application file for complete search history.

(56) References Cited

U.S. PATENT DOCUMENTS

| | | | |
|---|---|---|---|
| 7,633,193 B2 | 12/2009 | Masoudipour et al. | |
| 9,469,023 B2 | 10/2016 | Pal | |
| 9,729,020 B2 | 8/2017 | Pal | |

(Continued)

FOREIGN PATENT DOCUMENTS

| | | |
|---|---|---|
| EP | 2407380 A2 | 1/2012 |
| EP | 3401223 A1 | 11/2018 |

(Continued)

OTHER PUBLICATIONS

Extended European Search Report for European Patent No. 24157358.3, Dated Jul. 5, 2024, 6 Pages.

*Primary Examiner* — Christopher M Koehler
*Assistant Examiner* — Ethan Nguyen Vo
(74) *Attorney, Agent, or Firm* — Kinney & Lange, P.A.

(57) ABSTRACT

A system for cooling a cabin air compressor (CAC) motor includes a water separator which extracts water from airflow through a turbine and/or a fuel cell, and a CAC motor including cooling channels connected to an inlet and an outlet. The inlet of the CAC motor receives water from the water separator. The steam at the outlet of the CAC motor can be repurposed for warming utilities in an aircraft cabin, or for de-icing or increasing enthalpy of the turbine. The cooling water flow can be directed to the CAC motor in response to a predicted temperature of the CAC motor exceeding a threshold. The predicted temperature can be generated by feeding inputs including CAC motor input power measured by a power sensor, differential pressure measured by a pressure sensor, and a temperature at an air cooling inlet measured by a temperature sensor to a processor which generates a map model.

19 Claims, 8 Drawing Sheets

(51) Int. Cl.
*H02K 5/20* (2006.01)
*H02K 7/14* (2006.01)

(56) References Cited

U.S. PATENT DOCUMENTS

| | | | |
|---|---|---|---|
| 10,807,722 B2 | 10/2020 | Himmelmann | |
| 2001/0004837 A1* | 6/2001 | Sauterleute | B64D 13/06 |
| | | | 62/402 |
| 2015/0035392 A1 | 2/2015 | Pal | |
| 2018/0331599 A1* | 11/2018 | Parlante | H02K 9/04 |
| 2019/0291873 A1* | 9/2019 | Connell | B64D 13/06 |
| 2022/0194597 A1 | 6/2022 | Merritt et al. | |
| 2022/0194601 A1 | 6/2022 | Merritt et al. | |
| 2023/0399112 A1* | 12/2023 | Army | F04D 17/10 |

FOREIGN PATENT DOCUMENTS

| | | |
|---|---|---|
| EP | 4019784 A1 | 6/2022 |
| EP | 4019785 A1 | 6/2022 |

* cited by examiner

CAC MOTOR AUXILIARY WATER COOLING SYSTEM

BACKGROUND

Electric motors can be used within aircraft to drive compressors which compress air for delivery to an air cycle machine (ACM). Such an electric motor can be, for example, a cabin air compressor (CAC) motor. CAC motors can generate a high level of heat when used to drive the compressor. Thus, cooling of the CAC motor is necessary. Existing cooling solutions, such as using ram air, can create undesirable drag and can also fail to achieve enough cooling. Therefore, additional cooling of the CAC motor is desirable.

SUMMARY

A system for cooling a cabin air compressor (CAC) motor includes a turbine including a turbine outlet. The system further includes a water separator including a separator inlet fluidly connected to the turbine outlet of the turbine, and a first separator outlet. The water separator collects cooling water from the turbine. The system further includes a CAC motor including a motor housing, a first CAC inlet, and a first CAC outlet. The first CAC inlet is fluidly connected to the first separator outlet, such that the cooling water can flow from the first separator outlet to the first CAC inlet. The CAC motor housing includes a plurality of first cooling channels fluidly connected to the first CAC inlet such that the cooling water can flow from the first CAC inlet through the plurality of first cooling channels. The first CAC outlet is fluidly connected to the plurality of first cooling channels, such that the cooling water that is evaporated into steam within the first cooling channels exits through the first CAC outlet.

A method for cooling a motor includes directing fluid from a turbine, via a turbine outlet, to a water separator via a separator inlet. The method further includes separating cooling water from the fluid, via the water separator. The method further includes directing the cooling water from a first separator outlet of the water separator to a first cabin air compressor (CAC) inlet of a CAC motor. The method further includes directing the cooling water from the first CAC inlet through a plurality of cooling channels of the CAC motor. The method further includes directing the cooling water in the plurality of cooling channels to a CAC outlet of the CAC motor. The method further includes directing steam in the plurality of cooling channels that arises from evaporation of the cooling to the CAC outlet of the CAC motor.

DETAILED DESCRIPTION

According to the techniques of this disclosure, a cooling system can be used for water cooling of a motor. In particular, a cabin air compressor (CAC) motor can be connected within an air cycle machine (ACM). A turbine within the ACM can deliver air to a water separator, which in turn can direct cooling water to a CAC motor. The CAC motor can have a plurality of cooling channels through which the cooling water can flow to cool the CAC motor. The resulting steam from the cooling process of the CAC motor can be ejected outside the aircraft, directed to the cabin for utility purposes, or directed back to the turbine for increased enthalpy and/or de-icing. A processor can be used to predict the temperature of the CAC motor based on a mapping model, and the cooling process can be configured to begin when a predetermined predicted temperature threshold is exceeded.

Figure 1:
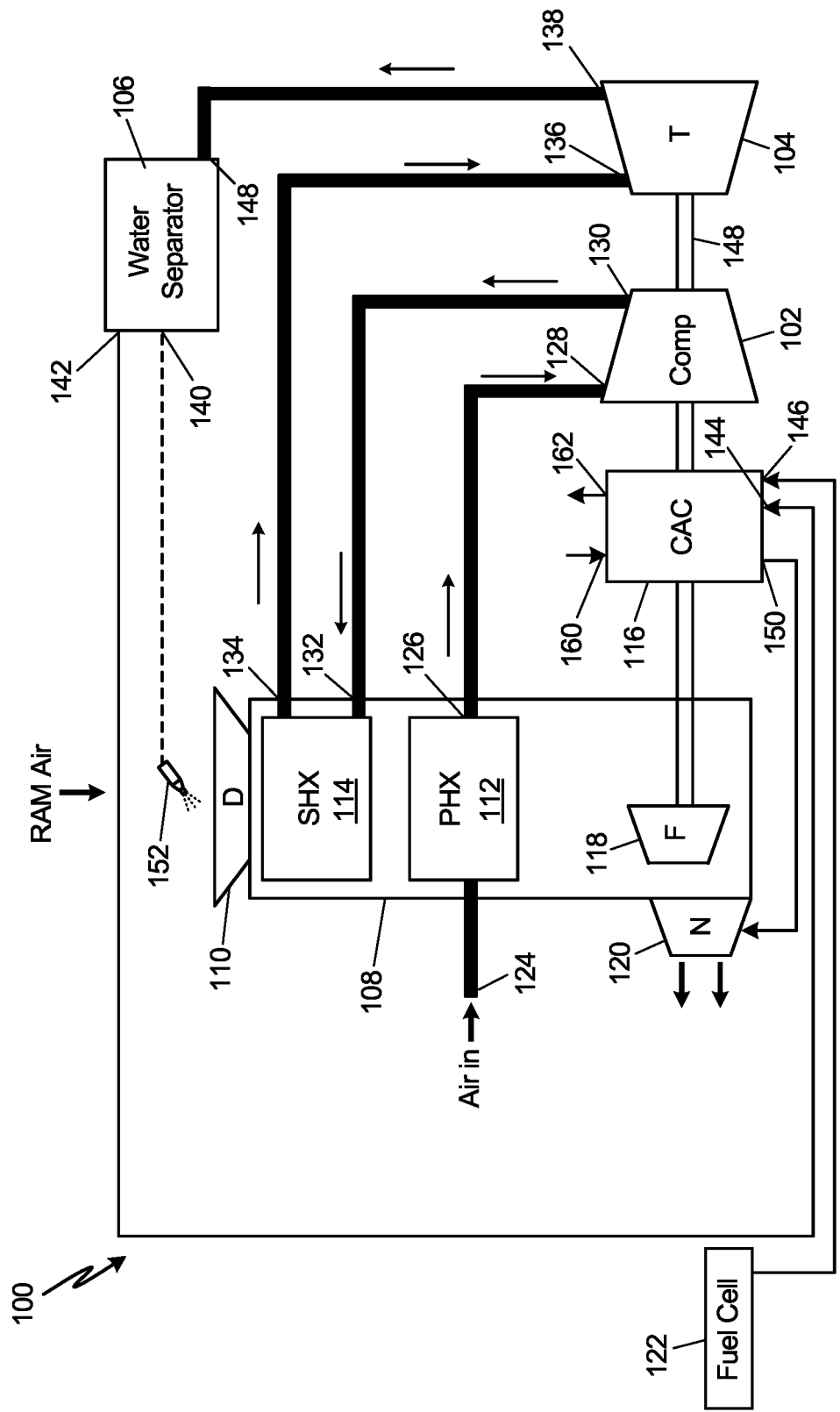
FIG. 1 is a schematic diagram depicting a CAC motor cooling system.

FIG. 1 is a schematic diagram depicting CAC motor cooling system 100. CAC motor cooling system includes compressor 102, turbine 104, water separator 106, ram air duct 108, CAC motor 116, fuel cell 122, and sprayer 152. Ram air duct 108 includes diffuser 110, primary heat exchanger 112, secondary heat exchanger 114, fan 118, and nozzle 120. Primary heat exchanger 112 includes primary heat exchanger inlet 124 and primary heat exchanger outlet 126. Secondary heat exchanger 114 includes secondary heat exchanger inlet 132 and secondary heat exchanger outlet 134. Compressor 102 includes compressor inlet 128 and compressor outlet 130. Turbine 104 includes turbine inlet 136 and turbine outlet 138. Water separator 106 includes separator inlet 148, first separator outlet 140, and second separator outlet 142. CAC motor 116 includes first CAC inlet 144, second CAC inlet 146, and CAC outlet 150. CAC motor 116 also includes air inlet 160 and air outlet 162.

In motor cooling system 100, primary heat exchanger 112 is connected to an external air supply (not shown) via primary heat exchanger inlet 124. Primary heat exchanger outlet 126 is fluidly connected to compressor inlet 128. Compressor outlet 130 is fluidly connected to secondary heat exchanger inlet 132. Secondary heat exchanger outlet 134 is fluidly connected to turbine inlet 136. Turbine 104, compressor 102, fan 118, and CAC motor 116 are connected to shaft 148 such that one or more turbine rotors, one or more compressor rotors, and fan 118 will all rotate in response to the rotation of shaft 148. Turbine outlet 138 is fluidly connected to separator inlet 148. Water separator 106, as depicted, has two outlet paths. First separator outlet 140 is fluidly connected to sprayer 152. Second separator outlet 142 is fluidly connected to first CAC inlet 144. Second CAC inlet 146 is fluidly connected to fuel cell 122. CAC outlet 150 is fluidly connected to nozzle 120.

Motor cooling system 100 operates by first receiving air in through primary heat exchanger inlet 124. As shown in FIG. 1, primary heat exchanger inlet 124 is located within ram air duct 108 between nozzle 120 and diffuser 110. The air entering primary heat exchanger inlet 124 can be ambient air that is drawn from a source exterior to the aircraft, such as atmosphere. The air can also be drawn from other sources including but not limited to the aircraft cabin. Air flows through primary heat exchanger 112 to be cooled by ram air flowing through ram air duct 108. Ram air is cooling air sourced from outside the aircraft. Ram air can flow through diffuser 110 as air is forced into ram air duct 108 while the aircraft is in motion. Ram air can also flow into ram air duct 108 while the aircraft is stationary via the operation of fan 118. Ram air flow across primary heat exchanger 112 to cool air flowing through primary heat exchanger 112. Ram air exits the aircraft through nozzle 120 after flowing over both primary heat exchanger 112 and secondary heat exchanger 114.

The air in primary heat exchanger 112 continues to flow through primary heat exchanger outlet 126 after cooling within primary heat exchanger 112. The air then flows into compressor 128 via compressor inlet 128. Rotors within compressor 128 compress the air such that the pressure of the air is increased. The compressed air then flows out of compressor 128 via compressor outlet 130 and into secondary heat exchanger 114 via secondary heat exchanger inlet 132. The compressed air is further cooled in secondary heat exchanger 114. Secondary heat exchanger 114 is also located within ram air duct 108 between primary heat exchanger 114 and diffuser 110 such that ram air flows across secondary heat exchanger 114 to cool the air flowing through secondary heat exchanger 114. As described with respect to primary heat exchanger 112, ram air flows across secondary heat exchanger 114 as the ram air flows through ram air duct 108 and exits through nozzle 120.

The compressed air then flows out of secondary heat exchanger 114 via secondary heat exchanger outlet 134 and into turbine 104 via turbine inlet 136. In some ACM embodiments, the compressed air may instead flow through a reheater and through a condenser prior to flowing into turbine 104 via turbine inlet 136. In still other embodiments, there may be a second turbine wherein the air flows through a first turbine, through a condenser, and through a second turbine. In the depicted embodiment, the air that was compressed by compressor 102 enters turbine 104 and expands, causing the air to rotate turbine rotors within turbine 104 and energize turbine 104. The rotation of the turbine rotors is used to drive and rotate shaft 148 such that the compressor rotors of compressor 102 and fan 118 are rotated and driven as shaft 148 is driven and rotated by turbine 104.

After passing through turbine 104, the air is then directed out of turbine 104 via turbine outlet 138 and into water separator 106 via separator inlet 148. Water separator 106 collects water out of the air. In one embodiment, water separator 106 uses a mechanical spinner to direct the air in a spiral direction, thereby separating the air and water using centrifugal force. In other embodiments, any air-water separator known in the art can be used. The water from water separator 106 is directed along two flow paths. The first flow path utilizes first separator outlet 140. In the first flow path, cooling water is directed through first separator outlet 140 and is directed to sprayer 152. Sprayer 152 sprays cooling water through diffuser 110 and into ram air duct 108 to provide additional cooling to primary heat exchanger 112 and secondary heat exchanger 114. The second flow path of water separator 106 utilizes second separator outlet 142. In the second flow path, cooling water flows from second operator outlet 142 to first CAC inlet 144. After passing through first CAC inlet 144, the cooling water is then directed through CAC motor 116 to provide cooling to CAC motor 116. The structure of CAC motor 116 that directs the cooling water through CAC motor 116 will be described below with reference to FIGS. 3 and 4.

In addition to directing cooling water from water separator 106 to CAC motor 116 for cooling of CAC motor 116, a cooling fluid can be directed from fuel cell 122 to CAC motor 116. In some embodiments, the cooling fluid sourced from fuel cell 122 to CAC motor 116 can be excess cooling water within fuel cell 122. In such an embodiment, excess cooling water from fuel cell 122 can enter the cooling channels of CAC motor 116 via second CAC inlet 146. Thus, in the depicted embodiment of FIG. 1, cooling water directed to first CAC inlet 144 by system 100 can come from water extracted from air exiting turbine 104 and cooling water directed to second CAC inlet 146 by system 100 can come from water extracted from fuel cell 122. In other embodiments, the cooling water passing through CAC motor 116 can come only from fuel cell 122 or only from turbine 104. Water traveling through CAC motor 116 can be converted to steam due to high temperatures within CAC motor 116. Excess water and/or steam can exit CAC motor 116 through CAC outlet 150 and can be ejected out of the aircraft through nozzle 120 to aid in aircraft propulsion.

In addition to the water cooling described with reference to FIG. 1, air cooling can also be used as an additional cooling source for CAC motor 116. Cooling air flow can come from ambient air exterior to the aircraft, turbine 104, the aircraft cabin, or other cooling air sources. In one example, cooling airflow from an aircraft cabin can be directed through air inlet 160 to CAC motor 116. The cooling airflow through the air inlet 160 can be directed through air cooling channels, as described below with reference to FIGS. 3 and 4. The cooling airflow can then exit CAC motor 116 through air outlet 162 and be released through nozzle 120, where is can be ejected with used ram air. The described example is merely one embodiment of how cooling air can flow through CAC motor 116 to provide cooling in addition to the water cooling.

Figure 2:
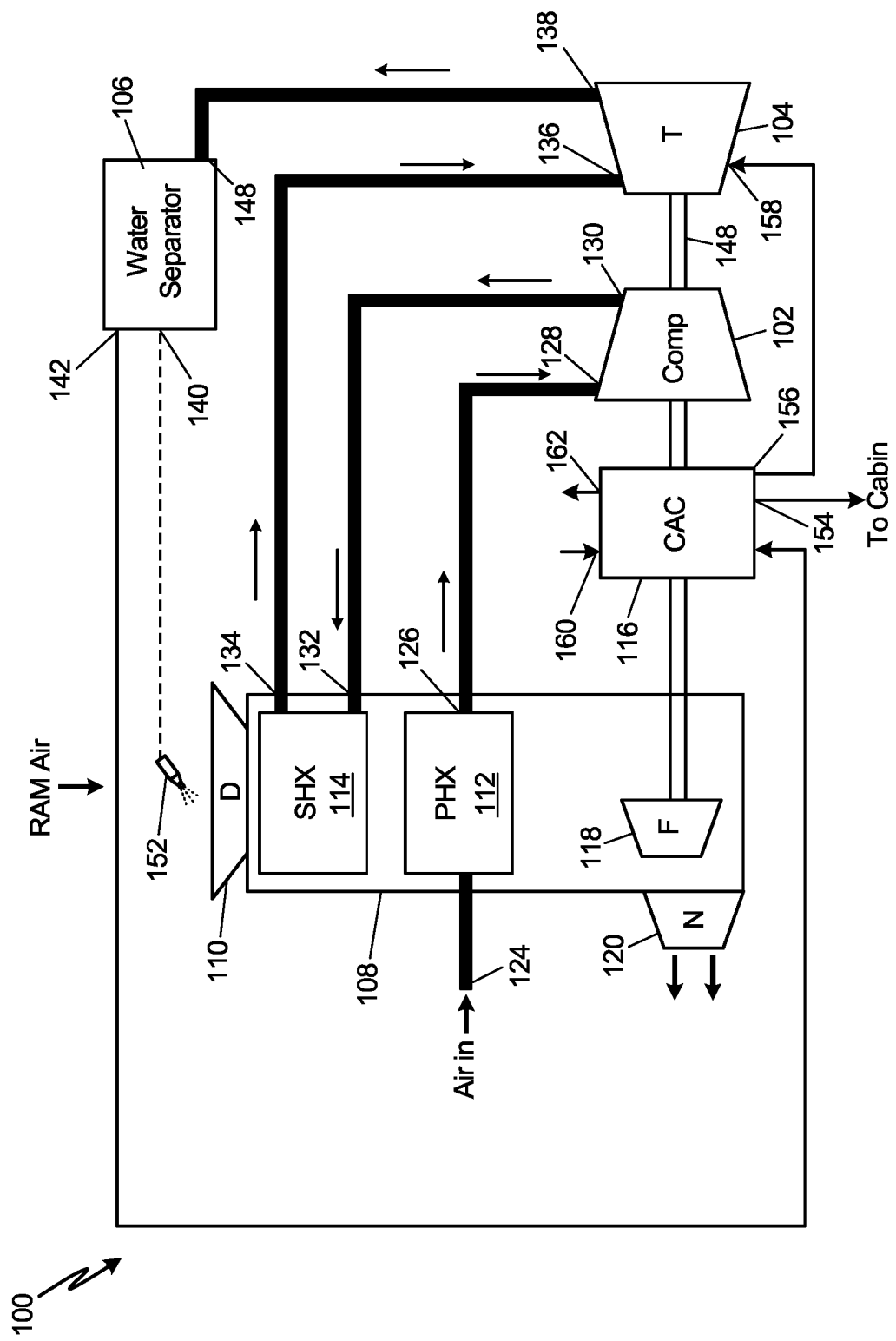
FIG. 2 is a schematic diagram depicting an alternative embodiment of the CAC motor cooling system.

FIG. 2 is a schematic depicting an alternative embodiment of system 100 depicted in FIG. 1. FIG. 2 depicts CAC motor cooling system 180. The parts of CAC motor cooling system 180 are largely similar to system 100. System 180, however, differs from system 100 in the fluid connections of CAC motor 116. CAC motor 116 includes CAC inlet 144, first CAC outlet 154 and second CAC outlet 156. CAC inlet 144 is connected as described in system 100 of FIG. 1. The depicted embodiment of system 180 does not contain a fuel cell or a second inlet for CAC motor 116. First CAC outlet 154 is fluidly connected to an aircraft cabin (not shown). Second CAC outlet 156 is fluidly connected to turbine 104 via second turbine inlet 158.

In operation, system 180 operates similarly to system 100. Air travels through primary heat exchanger 112, compressor 102, secondary heat exchanger 114, turbine 104, and water separator 106 in the same manner as system 100. Water separator 106 again has two outlet paths. A first outlet path sprays water via sprayer 152 through diffuser 110 for additional cooling across primary heat exchanger 112 and secondary heat exchanger 114. A second outlet path delivers cooling water flow through CAC inlet 144 and into cooling channels within CAC motor 116. As described above with respect to FIG. 1, CAC motor 116 can also undergo air cooling via air entering through air inlet 160, flowing through air cooling channels within CAC motor 116, and exiting the air cooling channels through air outlet 162.

In the embodiment of system 180 shown in FIG. 2, the water traveling through CAC motor 116 can be converted to steam due to high temperatures within CAC motor 116. Excess water and/or steam can be directed through first CAC outlet 154 and/or second CAC outlet 156. Excess water/steam directed through first CAC outlet 154 can flow to the aircraft cabin. In the aircraft cabin, the heated water or steam can be used for utility applications such as hot water for food warming or lavatories. Excess water/steam directed through second CAC outlet 156 can flow to turbine 104 via second turbine inlet 158. The steam at second turbine inlet 158 can increase the enthalpy of turbine 104, thereby increasing the power generated by turbine 104. The steam at second turbine inlet 158 can also be used to help control icing on or within turbine 104. In the depicted embodiment, both first CAC outlet 154 and second CAC outlet 156 are used simultaneously such that steam and/or water is directed through both paths. In other embodiments, system 180 can exclusively use first CAC outlet 154 or system 180 can exclusively use second CAC outlet 156. In other embodiments, system 180 can selectively use first CAC outlet 154 or selectively use second CAC outlet 156 via a valve.

The described embodiments of system 100 and system 180 in FIGS. 1 and 2 are intended to be illustrations and to be non-limiting. Various combinations of the outlet paths and inlet paths of CAC motor 116 can be applied. For example, in an additional embodiment of system 180, fuel cell 122 can be connected to CAC motor 116 via an additional CAC inlet. Further, in an additional embodiment of system 180, a third CAC outlet may connect to nozzle 120 to eject excess water/steam to atmosphere. Thus, the described embodiments are non-limiting and can be used in isolation or in combination.

Systems 100 and 180 provide the advantage of cooling for CAC motor 116. The cooling arises from the outgoing cooled air from turbine 104. Using the air exhausted by turbine 104 as a cooling source allows for increased efficiency as the airflow from turbine 104 is repurposed for cooling CAC motor 116. Additional cooling drawn from fuel cell 122 is also advantageous as an efficient method of cooling CAC motor 116. Additional sources of cooling water are contemplated by this disclosure, including cooling water arising from a vapor cycle system. The output of hot water/steam from CAC motor 116 is also advantageous because the hot water/steam can be repurposed in various ways. The hot water/steam can be recirculated in the cycle, including directing hot water/steam to primary heat exchanger inlet 124. Further, the hot water/steam can be used for cabin utilities and/or increasing enthalpy or de-icing of turbine 104. In the case that the hot water/steam cannot be repurposed, there is still an outlet for exhausting the excess hot water/steam overboard via nozzle 120.

Figure 3:
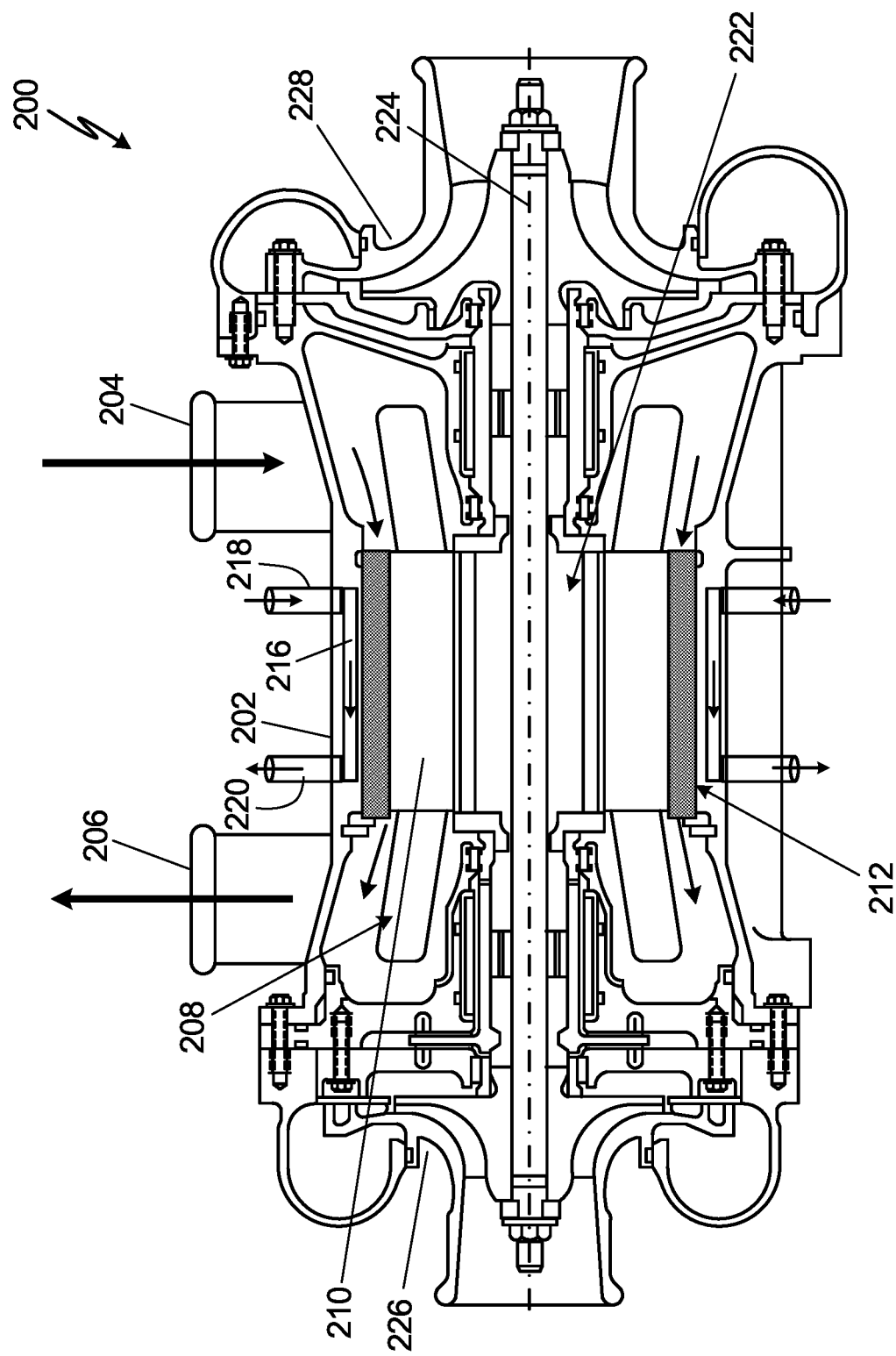
FIG. 3 is a cross-sectional view of a CAC motor with a plurality of cooling channels.
Figure 4:
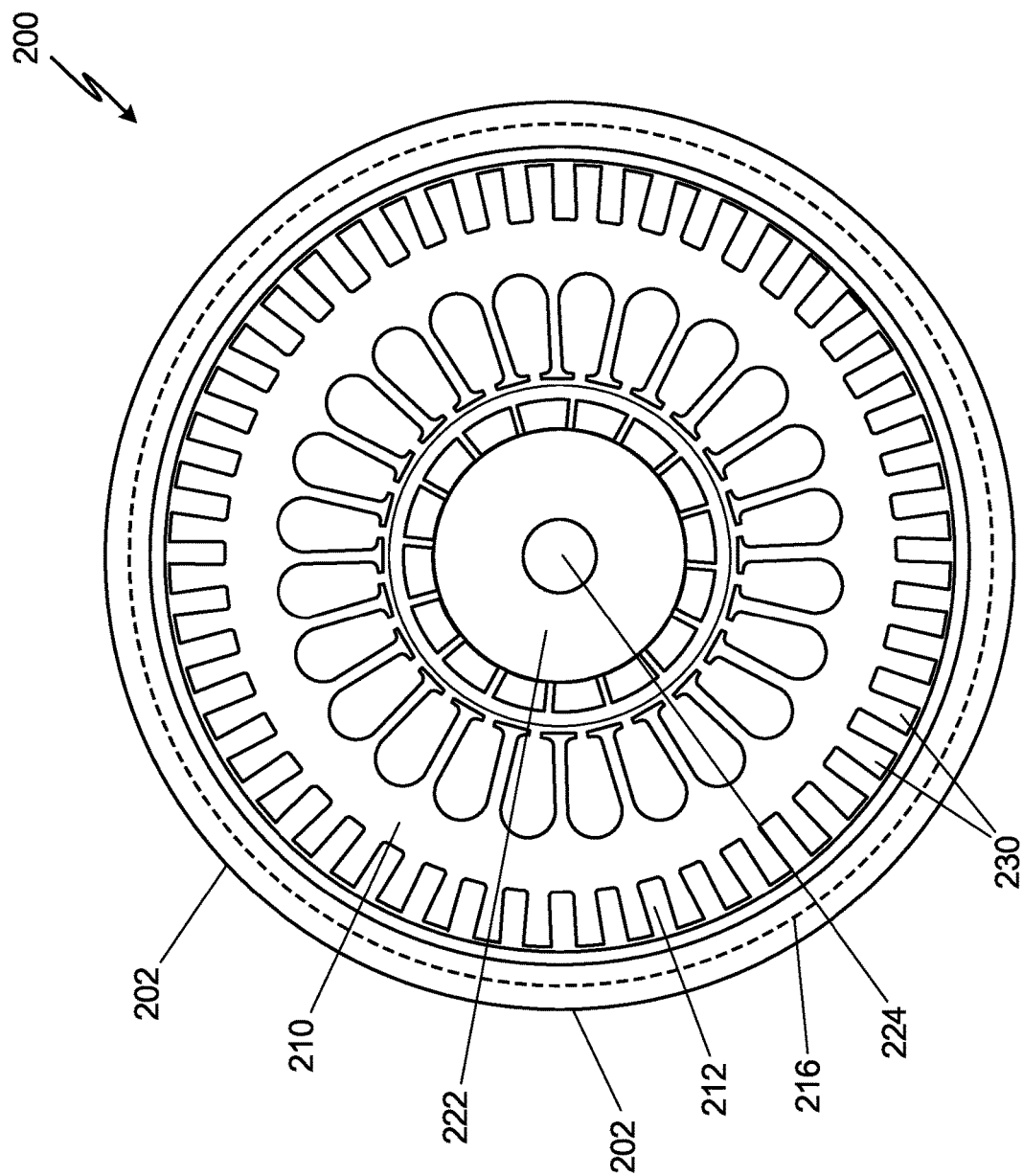
FIG. 4 is a cross-sectional view of a CAC motor with a plurality of cooling channels.

FIG. 3 depicts a cross-sectional view of CAC motor assembly 200 in a plane parallel to center axis 224. FIG. 4 depicts a cross-sectional view of CAC motor assembly 200 in a plane perpendicular to center axis 224 of CAC motor assembly 200. FIGS. 3 and 4 will be discussed together. CAC motor assembly 200 includes housing 202, compressor 226, compressor 228, fins 230, air cooling channels 212, water cooling channels 216, air cooling inlet 204, air cooling outlet 206, water cooling inlet 218, water cooling outlet 220, rotor 222, stator 208, and stator core 210.

Air cooling inlet 204 and air cooling outlet 206 extend from housing 202. Similarly, water cooling inlet 218 and water cooling outlet 220 also extend from housing 202. Rotor 222 is contained within housing 202 and is configured to rotate compressor 226 and compressor 228. Stator 208 contains stator core 210 and is positioned adjacent to air cooling channels 212, such that both stator 208 and air cooling channels 212 are contained within housing 202. Stator 208 contains fins 230 extending from stator core 210. Fins 230 can create air cooling channels 212 such that cooling air flows therein. Air cooling channels 212 extend within housing 202 to fluidically connect air cooling inlet 204 with air cooling outlet 206. Water cooling channels 216 are positioned adjacent to air cooling channels 212 and are also contained within housing 202. In some CAC motor applications, air cooling channels 212 may already exist and be contained within housing 202, while water cooling channels 216 do not. In such a case, water cooling channels 216 may be produced within housing 202 via additive manufacturing. Additive manufacturing can also be used to produce water cooling inlet 218 and water cooling outlet 220 within housing 202.

CAC motor assembly 200 is cooled both by air cooling and water cooling in the depicted embodiments. Cooling air flow can come from ambient air exterior to the aircraft, turbine 104, the aircraft cabin, or other cooling air sources. Cooling air flow enters through air cooling inlet 204, flows through air cooling channels 212, and exits through air cooling outlet 206. Cooling water flow enters through water cooling inlet 218, flows through water cooling channels 216, and exits through water cooling outlet 220. Water cooling channels are necessarily fluidly isolated from air cooling channels 212, rotor 222, and stator 208. Cooling water may contain impurities, rendering the water electrically conductive. In such a case, isolating the electrically conductive water from rotor 222 and stator 208 is desirable.

Water cooling flow through water cooling channels 216 can come from a variety of sources. As described in FIG. 1, cooling water flow can come from turbine 104 via water separator 106 and into water cooling inlet 218. Cooling water flow can also come from fuel cell 122 into water cooling inlet 218. In the case that cooling water flow is obtained from both fuel cell 122 and turbine 104, CAC motor assembly 200 may have two water cooling inlets that are fluidly connected to water cooling channels 216. In other embodiments, CAC motor assembly 200 may receive both sources of cooling water flow through water cooling inlet 218.

Water cooling outlet 220 can also be connected to various downstream components. As described in FIG. 1, water cooling outlet 220 can be fluidly connected to nozzle 120 such that excess water or steam is ejected overboard, outside of the aircraft. As described in FIG. 2, excess water or steam can also be directed to the aircraft cabin for utility purposes, or back to turbine 104 for de-icing or increased enthalpy.

The configuration of CAC motor assembly 200 provides the advantage of providing for two stages of cooling, air cooling and water cooling. Thus, a greater amount of heat generated by the CAC motor can be mitigated when both cooling sources are used. Further, the upstream connection of water cooling inlet 218 to turbine 104 and the downstream connections of water cooling outlet 220 to the aircraft cabin and/or turbine 104 also provide advantages described above with respect to FIGS. 1 and 2.

Figure 5:
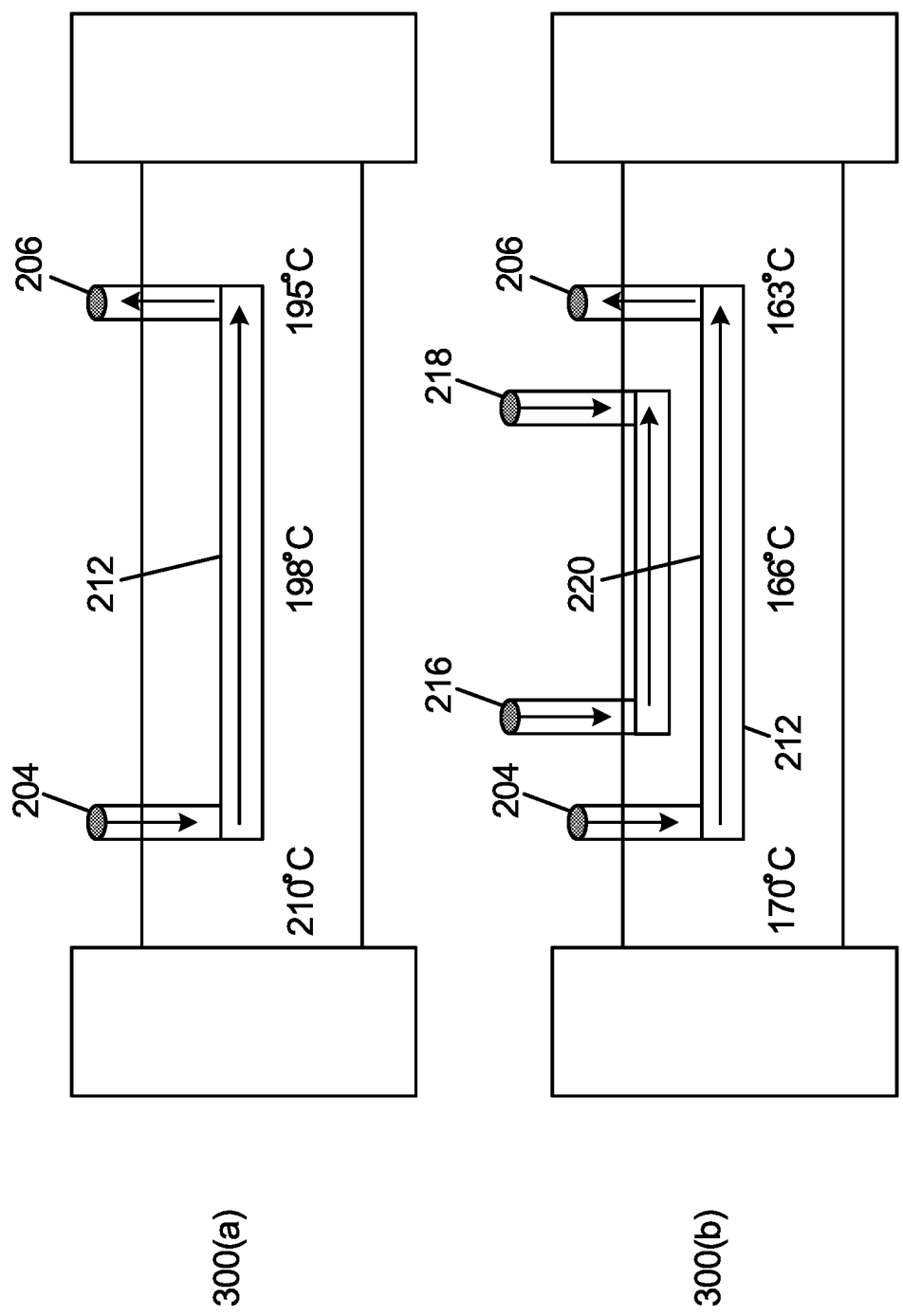
FIG. 5 is a diagram depicting cooling across a stator of a CAC motor.

FIG. 5 depicts air cooled stator 300(*a*) and air and water cooled stator 300(*b*). Included in the depiction of stator 300(*a*) is air cooling inlet 204, air cooling outlet 206, and air cooling channels 212 (only one of which is shown in FIG. 5). Included in the depiction of stator 300(*b*) is air cooling inlet 204, air cooling outlet 206, air cooling channels 212, water cooling inlet 216, water cooling outlet 218, and water cooling channels 220.

In FIG. 5, air cooled stator 300(*a*) and air and water cooled stator 300(*b*) are both placed in a similar environment and are under similar operating conditions and loads of a CAC motor. Temperature measurements are shown on stators 300(*a*) and 300(*b*) to show and compare temperature gradients across stators 300(*a*) and 300(*b*) during operation. In stator 300(*a*), wherein only air cooling is applied, the temperature of stator 300(*a*) near air cooling inlet 204 is 210° C. the temperature near the center of stator 300(*a*) is 198° C., and the temperature of stator 300(*a*) near air cooling outlet 206 is 195° C. Stator 300(*b*), where water cooling is applied in addition to the air cooling, shows improved cooling over stator 300(*a*). In the example testing environment of FIG. 5, the water entering water cooling inlet 216 is near or at the vaporization point of 100° C. As depicted in stator 300(*b*), the temperature of stator 300(*b*) near air cooling inlet 204 is 170° C. the temperature of stator 300(*b*) near the center of stator 300(*b*) is 166° C., and the temperature of stator 300(*b*) near air cooling outlet 206 is 163° C. Thus, the addition of the water cooling channel provides the advantage of increased cooling capability when used in combination with existing air cooling.

The present application does not require an excessive amount of water to ensure cooling is accomplished as described. Sample heat transfer characteristics can be used to determine how much water flow is required to accomplish the cooling. The heat transfer from water cooling can be calculated using Equation 1 below.

$$Q = (m * c * \Delta T) + (m * hfg) \qquad \text{Equation 1}$$

In the Equation 1, Q is the heat absorbed by the water from the motor, m is the mass flow rate of water, c is the specific heat of water, $\Delta T$ is the increase in temperature of the water from the inlet to the outlet, and hfg is the latent heat of evaporation. Table 1 shown below was generated from Equation 1 with boiling set at 1 bar.

TABLE 1

| Heat Transfer With Boiling Set at 1 Bar | | | |
| --- | --- | --- | --- |
| Water flow rate lbm/min | Water flow rate (m) kg/s | hfg kJ/kg | Heat transfer from water cooling (Q) kW |
| 0.1 | 0.00075599 | 2258 | 1.707 |
| 0.2 | 0.00151198 | 2258 | 3.416 |

As shown in Table 1, a desired heat transfer of 1.707 kW requires a flow rate of 0.1 lbm/min. Additionally, increasing the flow rate to 0.2 lbm/min provides a heat transfer Q value of 3.416 kW. Thus, sufficient heat transfer can be achieved with water cooling without the need for excessive water flow through water cooling channels 220.

The stator cooling depicted in FIG. 5 demonstrates the advantage of water cooling in addition to air cooling. As shown in Table 1, additional cooling in the range of 40° C. can be obtained by adding water cooling to a CAC motor. Further, the calculations shown in Table 1 demonstrate that such cooling does not require a high flow rate of water. Thus, in addition to the efficiencies described in FIGS. 1 and 2, the present disclosure is an improvement over existing cooling of a CAC motor.

Figure 6:
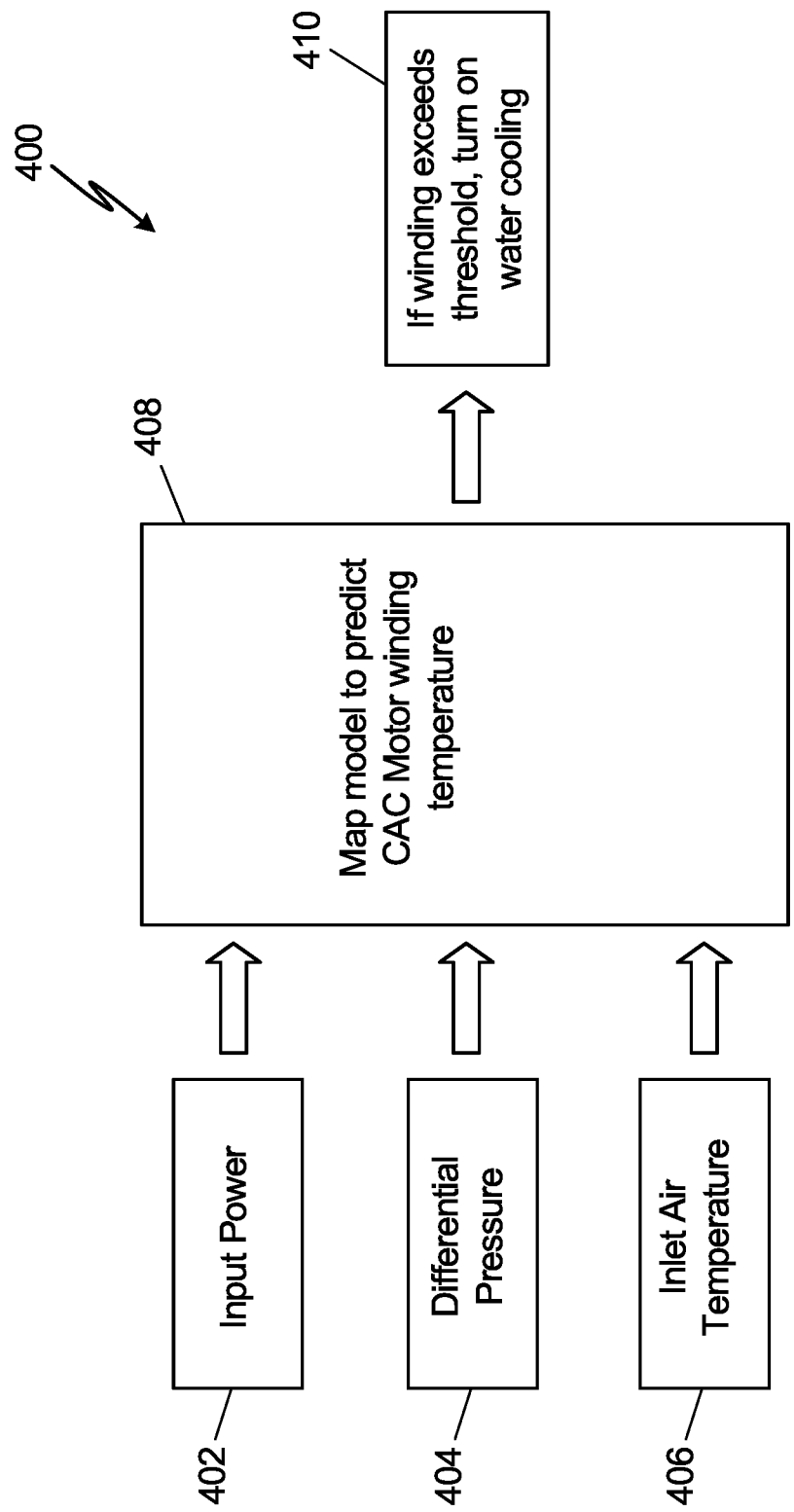
FIG. 6 is a flowchart depicting a method of turning on a CAC motor cooling system in response to high temperatures.

FIG. 6 depicts method 400 which is a method of turning on the CAC motor cooling system in response to high temperatures. Due to the heat arising out of the CAC motor, mounting a device for sensing temperature within the CAC motor is not a feasible solution for determining when additional cooling is required. Thus, a model can be mapped based on known parameters to calculate a predicted temperature of the stator windings within the CAC motor.

In the embodiment depicted in method 400, map model 408 takes input power 402, differential pressure 404, and inlet air temperature 406 as inputs to a processor in order to calculate the predicted temperature of the stator windings. Input power 402 is the input power to a common motor start controller (CMSC), which is used to power the CAC motor. The input power can be a constant value required to power CAC motor that is known by the processor. In other embodiments, there can be a power sensor at the input of the CAC motor which detects the value of the input power to the CAC motor and transmits the value of the input power to the processor. Differential pressure 404 is the differential pressure across the CAC motor. The value of the differential pressure across the CAC motor can be measured by a differential pressure sensor, and transmitted to the processor. The inlet air temperature is the air temperature measured at the air cooling inlet of the CAC motor such as air cooling inlet 204 of FIG. 3. The inlet air temperature can be measured by a temperature sensor mounted near air cooling inlet 204 and transmitted to the processor. Transmission of the parameters including input power, differential pressure, and inlet air temperature can be through electrical connections or through wireless connections with the processor. Once the parameters are received from the respective sensors, the processor can create map model 408 wherein predicted temperature outputs are generated based on the input parameters. The temperature outputs in map model 408 are predicted temperatures of the stator windings.

In response to the predicted temperature from map model 408 exceeding a temperature threshold, water cooling can be activated. For example, the temperature threshold can be set at 175° C., such that the water cooling is turned on when the predicted stator winding temperature exceeds 175° C. The water separator is configured to direct water through a separator outlet such as second separator outlet 142 of FIG. 1, to a CAC inlet, such as the first CAC inlet 144 of FIG. 1.

Figure 7:
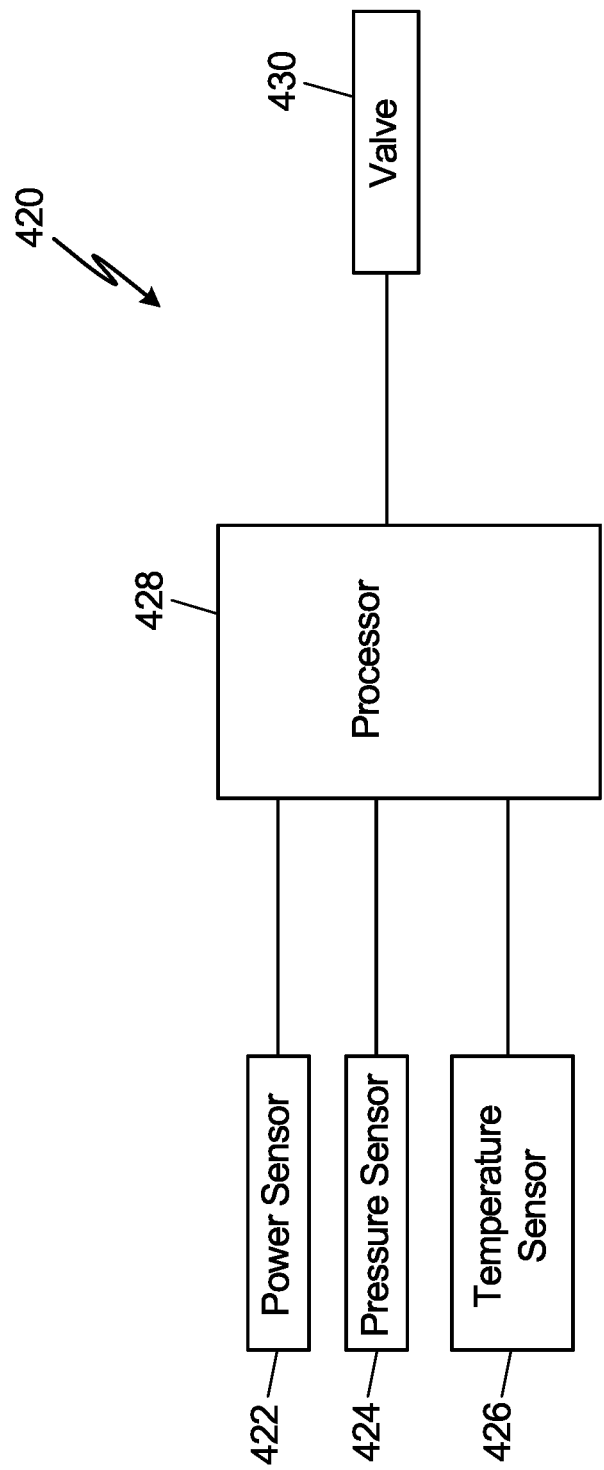
FIG. 7 is a diagram depicting a system for turning on a CAC motor cooling system in response to high temperatures.

FIG. 7 depicts water cooling system 420 in which water cooling is turned on in response to high temperatures. System 420 includes power sensor 422 which can be a sensor at the input of the CAC motor configured to detect the value of the input power to the CAC motor and transmits the value of the input power to the processor. System 420 also includes pressure sensor 424 which can be a differential pressure sensor configured to sense the pressure across the CAC motor. System 420 also includes temperature sensor 426, which can be a temperature sensor located near an air cooling inlet, such as air cooling inlet 204 of FIG. 3.

Power sensor 422, pressure sensor 424 and temperature sensor 426 all transmit their respective measurements to processor 428. Processor 428 can then generate map model 408 of FIG. 6, and produce a predicted temperature. If the predicted temperature exceeds a temperature threshold, processor 428 can send a signal to valve 430, where valve 430 is included within a water separator, such as water separator 106 of FIGS. 1 and 2. Valve 430 can be configured to open in response to a signal from processor 428 indicating that the predicted temperature exceeds the temperature threshold. Valve 430 can be configured to close in response to a signal from processor 428 indicating that the predicted temperature does not exceed the temperature threshold.

System 420 is one embodiment of a water cooling system in which water cooling is turned on in response to high temperatures. In other embodiments, water is directed by operation of a pump instead of the opening or closing of a valve. Additionally, the valve or pump can be located, for example, at the outlet of a turbine such as turbine 104 of FIGS. 1 and 2. The valve or pump can also be located, for example, at the inlet of the CAC motor, such that cooling water flow does not enter cooling channels within the CAC motor until the processor indicates that the valve can be opened or the pump can be activated.

In other embodiments, water can be directed continuously through the cooling channels of the CAC motor without relying on the map model. In still other embodiments, the flow of water conducted through the cooling channels can be continuous, but the flow rate of the water can increase in response to the predicted stator winding temperature exceeding a temperature threshold. Further, a higher flow rate can be permitted through the CAC winding depending on the quantity of the difference between the predicted temperature and the temperature threshold. Thus, for example, a higher flow rate of water can travel through the cooling channels at a predicted temperature of 210° C. as compared to the flow rate when the temperature is 180° C.

Method 400 and system 420 provides the advantage of regulating water flow through the CAC motor for cooling as well as determining predicted temperatures without the need for mounting a temperature sensor within the CAC motor. As described with respect to Table 1 above, excessive amounts of water are not required to accomplish cooling of the motor. Using the method 400 and system 420 described with respect to FIGS. 6 and 7, additional conservation of water can be achieved as water can be stored and saved until the temperature threshold is exceeded.

Figure 8:
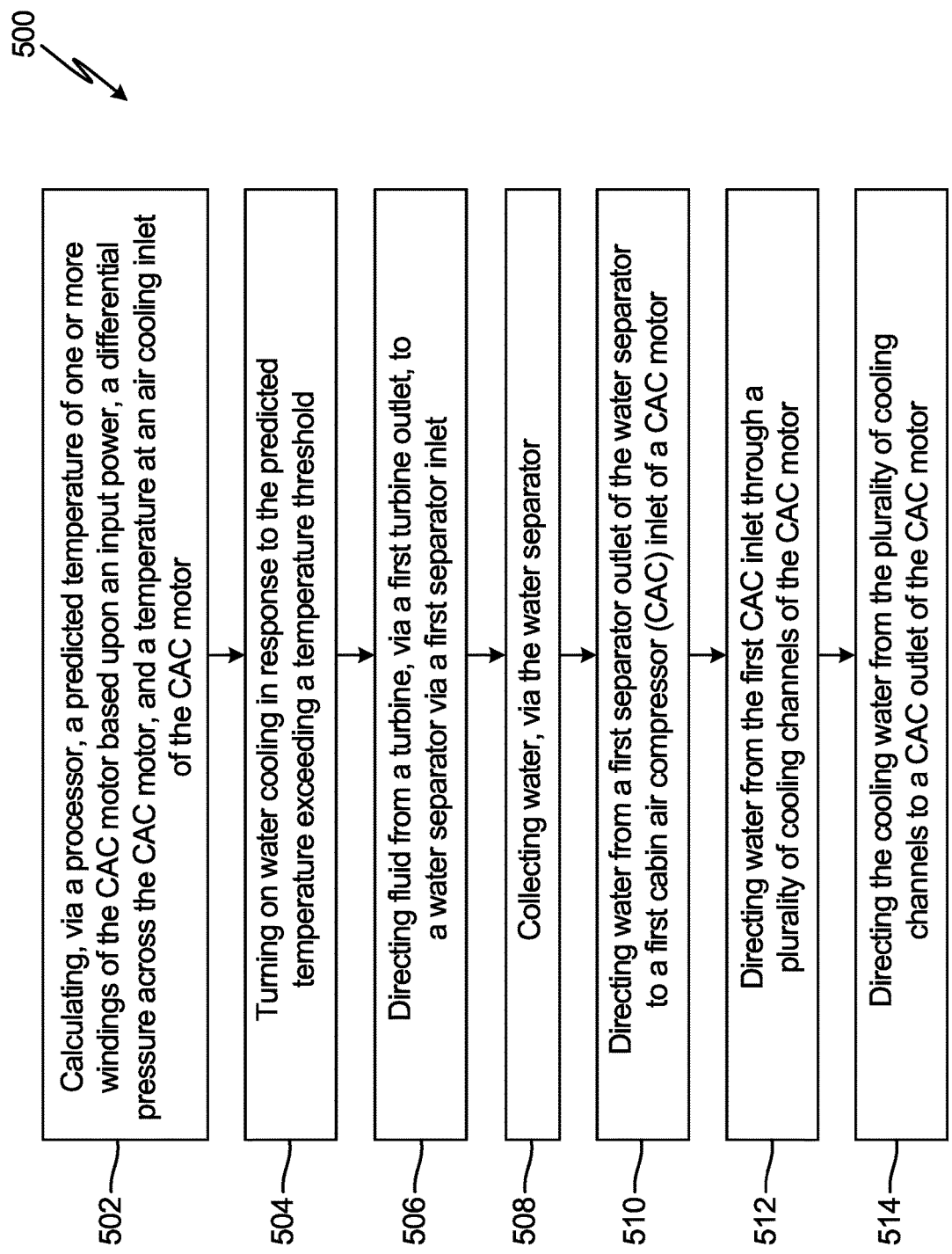
FIG. 8 is a flowchart depicting a method of cooling a CAC motor.

FIG. 8 is a flowchart depicting method of cooling a CAC motor 500. Method 500 begins at step 502 with calculating, via a processor, a predicted temperature of one or more windings of the CAC motor based upon an input power to the CAC motor, a differential pressure across the CAC motor, and a temperature at an air cooling inlet of the CAC motor. The input power to the CAC motor can be a power directed to the motor from a common motor start controller (CMSC). The predicted temperature can be obtained via map model 408 described above in the description of FIGS. 6 and 7.

At step 504, water cooling is turned on in response to the predicted temperature exceeding a temperature threshold. Turning on water cooling can involve opening a valve at a water collector or starting the operation of a pump from the water collector. Water cooling involves the steps of 506-514 described below.

At step 506, fluid is directed from a turbine, via a turbine outlet, to a water separator via a separator inlet. The fluid directed from the turbine can be cooling airflow that contains a mixture of air and cooling water. At step 508 water is collected from the cooling airflow via the water separator. The water separator is configured to separate the water from the airflow that passes through the turbine and arrives at the water separator.

At step 510, water from the first separator outlet of the water separator is directed to a first CAC inlet of a CAC motor. In some embodiments, an additional step of method 500 can also include receiving cooling water at a second CAC inlet. The second source of cooling water can be, for example, from fuel cell 122 shown in FIG. 1.

At step 512, water is directed from the first CAC inlet through a plurality of cooling channels of the CAC motor. In some embodiments, there is a first plurality of cooling channels and second plurality of cooling channels. The first plurality of cooling channels is used for air cooling and the second plurality of cooling channels is used for water cooling. In such an embodiment, water cooling and air cooling together provide cooling to the CAC motor.

At step 514, the cooling water from the plurality of cooling channels of the CAC motor can be directed to a CAC outlet of the CAC motor. The CAC outlet can also output steam that arises from evaporation of the cooling water flowing through the plurality of cooling channels. The steam can then be repurposed for a variety of uses including cabin utilities, turbine enthalpy, and/or turbine de-icing, or can be disposed of by ejection through a nozzle.

The techniques of this disclosure demonstrate the advantages of water cooling in addition to air cooling of a CAC motor. As described above, airflow from a turbine can be efficiently repurposed, via a water separator, to provide cooling water flow through cooling channels of a CAC motor. Water extracted from a fuel cell can also be used to provide cooling water flow through said cooling channels. Further, the cooling water flow can be activated in response to a temperature threshold of the CAC motor being met. The temperature of the CAC motor can be predicted based on input parameters to a map model. Such a prediction allows for cooling water flow to be conducted when necessary.

Discussion of Possible Embodiments

The following are non-exclusive descriptions of possible embodiments of the present invention.

A system for cooling a cabin air compressor (CAC) motor includes a turbine including a turbine outlet. The system further includes a water separator comprising a separator inlet fluidly connected to the turbine outlet of the turbine, and a first separator outlet. The water separator collects cooling water from the turbine. The system further includes a CAC motor comprising a motor housing, a first CAC inlet, and a first CAC outlet. The first CAC inlet is fluidly connected to the first separator outlet, such that the cooling water can flow from the first separator outlet to the first CAC inlet. The CAC motor housing includes a plurality of first cooling channels fluidly connected to the first CAC inlet such that the cooling water can flow from the first CAC inlet through the plurality of first cooling channels. The first CAC outlet is fluidly connected to the plurality of first cooling channels, such that the cooling water that is evaporated into steam within the first cooling channels exits through the first CAC outlet.

The system of the preceding paragraph can optionally include, additionally and/or alternatively, any one or more of the following features, configurations and/or additional components:

A further embodiment of the foregoing system, further comprising a processor configured to calculate a predicted temperature of one or more windings of the CAC motor based upon an input power to the CAC motor, a differential pressure across the CAC motor, and a temperature at the first CAC inlet.

A further embodiment of any of the foregoing systems, wherein the water separator is configured to open a separator valve to direct water through the first separator outlet to the first CAC inlet when the processor indicates the predicted temperature exceeds a temperature threshold.

A further embodiment of any of the foregoing systems, wherein the water separator comprises a second separator outlet fluidly connected to a diffuser.

A further embodiment of any of the foregoing systems, wherein a heat exchanger is downstream from the diffuser such that the diffuser diffuses water from the water separator onto an external side of the heat exchanger.

A further embodiment of any of the foregoing systems, wherein the first CAC outlet is fluidly connected to atmosphere by a nozzle.

A further embodiment of any of the foregoing systems, wherein the CAC motor further comprises a second CAC inlet, wherein the second CAC inlet is fluidly connected to a fuel cell outlet.

A further embodiment of any of the foregoing systems, wherein the fuel cell outlet is fluidly connected to the second CAC inlet.

A further embodiment of any of the foregoing systems, wherein the first CAC outlet is fluidly coupled to a cabin inlet of an aircraft cabin.

A further embodiment of any of the foregoing systems, wherein the first CAC outlet is fluidly coupled to a turbine inlet of the turbine.

A further embodiment of any of the foregoing systems, wherein the CAC motor further comprises a second CAC outlet fluidly connected to the plurality of first cooling channels.

A further embodiment of any of the foregoing systems, wherein the first CAC outlet is fluidly coupled to a cabin inlet of an aircraft cabin and the second CAC outlet is fluidly coupled to a turbine inlet of the turbine.

A further embodiment of any of the foregoing systems, wherein the motor housing with the plurality of first cooling channels is additively manufactured.

A further embodiment of any of the foregoing systems, wherein the CAC motor further comprises a plurality of second cooling channels.

A further embodiment of any of the foregoing systems, wherein the plurality of second cooling channels are formed between a stator of the CAC motor and the motor housing.

A method for cooling a motor includes directing fluid from a turbine, via a turbine outlet, to a water separator via a separator inlet. The method further includes separating cooling water from the fluid, via the water separator. The method further includes directing the cooling water from a first separator outlet of the water separator to a first cabin air compressor (CAC) inlet of a CAC motor. The method further includes directing the cooling water from the first CAC inlet through a plurality of cooling channels of the CAC motor. The method further includes directing the cooling water in the plurality of cooling channels to a CAC outlet of the CAC motor. The method further includes directing steam in the plurality of cooling channels that arises from evaporation of the cooling to the CAC outlet of the CAC motor.

A further embodiment of any of the foregoing methods, further including calculating, via a processor, a predicted temperature of one or more windings of the CAC motor based upon an input power of the CAC motor received from a power sensor, a differential pressure across the CAC motor received from a pressure sensor, and a temperature at the first CAC inlet received from a temperature sensor. The method further includes performing the steps of directing the fluid from the turbine, separating the cooling water from the fluid via the water separator, directing the cooling water from the first separator outlet to the first CAC inlet, directing the cooling water from the first CAC inlet through the plurality of cooling channels, and directing the cooling water in the plurality of cooling channels to the CAC outlet in response to the predicted temperature exceeding a temperature threshold.

A further embodiment of any of the foregoing methods, further including directing water from a second separator outlet of the water separator to a diffuser.

A further embodiment of any of the foregoing methods, further including diffusing water from the water separator, via the diffuser, onto an external side of a heat exchanger.

A further embodiment of any of the foregoing methods, further including directing steam from the first CAC outlet to atmosphere by a nozzle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for cooling a cabin air compressor (CAC) motor, comprising:
   a turbine comprising a turbine outlet;
   a water separator comprising a separator inlet fluidly connected to the turbine outlet of the turbine, and a first separator outlet, wherein the water separator collects cooling water from the turbine;
   the CAC motor comprising a motor housing, a first CAC inlet, and a first CAC outlet, wherein:
      the first CAC inlet is fluidly connected to the first separator outlet, such that the cooling water can flow from the first separator outlet to the first CAC inlet;
      the CAC motor housing comprises a plurality of first cooling channels fluidly connected to the first CAC inlet such that the cooling water can flow from the first CAC inlet through the plurality of first cooling channels; and
      the first CAC outlet is fluidly connected to the plurality of first cooling channels, such that the cooling water that is evaporated into steam within the first cooling channels exits through the first CAC outlet.

2. The system of claim 1, further comprising a processor configured to calculate a predicted temperature of one or more windings of the CAC motor based upon an input power to the CAC motor, a differential pressure across the CAC motor, and a temperature at the first CAC inlet.

3. The system of claim 2, wherein the water separator is configured to open a separator valve to direct water through the first separator outlet to the first CAC inlet when the processor indicates the predicted temperature exceeds a temperature threshold.

4. The system of claim 1, wherein the water separator comprises a second separator outlet fluidly connected to a diffuser.

5. The system of claim 4, wherein a heat exchanger is downstream from the diffuser such that the diffuser diffuses water from the water separator onto an external side of the heat exchanger.

6. The system of claim 1, wherein the first CAC outlet is fluidly connected to atmosphere by a nozzle.

7. The system of claim 1, wherein the CAC motor further comprises a second CAC inlet, wherein the second CAC inlet is fluidly connected to a fuel cell outlet.

8. The system of claim 1, wherein the first CAC outlet is fluidly coupled to a cabin inlet of an aircraft cabin.

9. The system of claim 1, wherein the first CAC outlet is fluidly coupled to a turbine inlet of the turbine.

10. The system of claim 1, wherein the CAC motor further comprises a second CAC outlet fluidly connected to the plurality of first cooling channels.

11. The system of claim 10, wherein the first CAC outlet is fluidly coupled to a cabin inlet of an aircraft cabin and the second CAC outlet is fluidly coupled to a turbine inlet of the turbine.

12. The system of claim 1, wherein the motor housing with the plurality of first cooling channels is additively manufactured.

13. The system of claim 1, wherein the CAC motor further comprises a plurality of second cooling channels.

14. The system of claim 13, wherein the plurality of second cooling channels are formed between a stator of the CAC motor and the motor housing.

15. A method for cooling a motor, comprising:
directing fluid from a turbine, via a turbine outlet, to a water separator via a separator inlet;
separating cooling water from the fluid, via the water separator;
directing the cooling water from a first separator outlet of the water separator to a first cabin air compressor (CAC) inlet of a CAC motor;
directing the cooling water from the first CAC inlet through a plurality of cooling channels of the CAC motor;
directing the cooling water in the plurality of cooling channels to a CAC outlet of the CAC motor; and
directing steam in the plurality of cooling channels that arises from evaporation of the cooling to the CAC outlet of the CAC motor.

16. The method of claim 15, further comprising:
calculating, via a processor, a predicted temperature of one or more windings of the CAC motor based upon an input power of the CAC motor measured by a power sensor, a differential pressure across the CAC motor measured by a pressure sensor, and a temperature at an air cooling inlet of the CAC motor measured by a temperature sensor; and
performing the steps of directing the fluid from the turbine, separating the cooling water from the fluid via the water separator, directing the cooling water from the first separator outlet to the first CAC inlet, directing the cooling water from the first CAC inlet through the plurality of cooling channels, and directing the cooling water in the plurality of cooling channels to the CAC outlet in response to the predicted temperature exceeding a temperature threshold.

17. The method of claim 15, further comprising:
directing water from a second separator outlet of the water separator to a diffuser.

18. The method of claim 17, further comprising:
diffusing water from the water separator, via the diffuser, onto an external side of a heat exchanger.

19. The method of claim 15, further comprising:
directing steam from the first CAC outlet to atmosphere by a nozzle.

* * * * *